Aug. 9, 1932.    E. W. EVANS    1,870,675
TEMPERATURE CONTROL IN FORCE FEED LUBRICATING OIL SYSTEMS
Filed Oct. 30, 1928
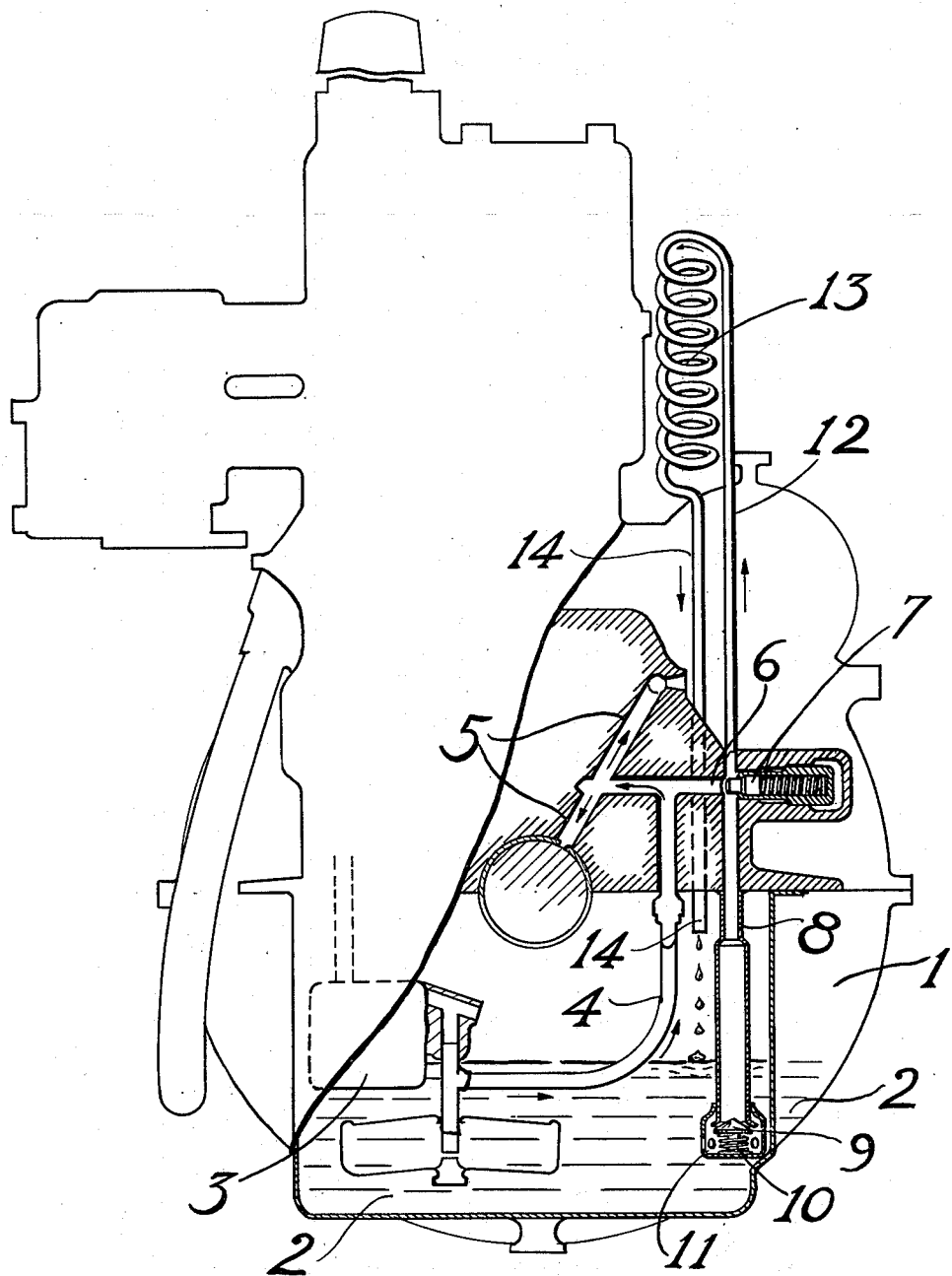
Earle W. Evans Inventor
By his Attorney Patented Aug. 9, 1932

1,870,675

UNITED STATES PATENT OFFICE

EARLE W. EVANS, OF LINDEN, NEW JERSEY, ASSIGNOR TO STANDARD OIL DEVELOPMENT COMPANY, A CORPORATION OF DELAWARE

TEMPERATURE CONTROL IN FORCE FEED LUBRICATING OIL SYSTEMS

Application filed October 30, 1928. Serial No. 316,092.

This invention relates to improvements in controlling the operating temperature of lubricating oil. For the purpose of illustration, my improvements will be described in connection with an automobile force-feed or semi-force-feed lubricating system, although the improvements are not limited to this use.

The invention will be fully understood from the following description, read in connection with the accompanying drawing, in which the single figure is a diagrammatic, partly sectional elevation of an automobile engine and crank case.

In the drawing, 1 denotes a crank-case or reservoir containing a body of lubricating oil 2. An oil pump 3, actuated in any suitable way, preferably by connection with the engine, forwards the oil through pipe 4 and branches 5 to the bearings. A by-pass 6, controlled by a valve 7, receives any oil in excess of that required to keep the desired oil pressure in the bearings. The valve 7 may be of any suitable pressure-regulating type, such as are commonly used for by-pass systems of this kind. The by-passed oil returns to the bulk supply in the crank-case through a pipe 8, which may be referred to as the normal return passageway.

In accordance with my invention, a valve 9 governs the flow of oil through pipe 8, in relation with the temperature of the oil. This valve is actuated by a thermostat or other heat responsive element 10 seated in a perforated housing 11, immersed in the oil. A pipe 12 is in circuit with pipe 8 and leads upward to a cooling coil 13. This is an air-cooled coil, as shown, but water cooling or other equivalent means may be adopted. A return line 14 conveys the cooled oil back to the supply in the crank-case.

The operation of the device is as follows: When the body of oil 2, heated by operation of the engine, reaches a pre-determined temperature, the thermostatic valve 9 begins to close, obstructing or shutting off the normal path of by-passed oil through pipes 6 and 8. Accordingly oil ascends through pipe 12 to the coil 13, where it is cooled and is then returned to the crank-case through pipe 14. The thermostatic valve and the cooling area are adjusted so as to hold the proper operating temperature, for example, about 130° F. If the valve 9 is open, oil does not rise through pipe 12, but follows the line of gravity flow through pipe 8.

When the temperature of the oil falls below the fixed point, the thermostatic valve opens and the oil from by-pass 6 resumes its ordinary course through pipe 8.

Oil pumps in automobiles are ordinarily responsive to the speed of the engine. As engine speed increases, more oil is pumped, the oil pressure rises, and more oil circulates through the by-pass. A greater volume of oil may pass through the cooling coil, therefore, when the engine is working hard. This is as it should be, since the oil temperature tends to run high under those conditions. Any desired manual adjustment may be provided for the valves 7 and 9. They automatically maintain the temperature and pressure of the circulating oil at the proper value.

Various changes and alternative arrangements may be made within the scope of the appended claims in which it is my intention to claim all novelty inherent in the invention as broadly as the prior art permits.

I claim:

1. In a temperature controlling means for lubricating systems, the improvement which comprises a reservoir, a passageway through which oil normally flows to the reservoir, heat-responsive means for diverting said flow at least in part, means for changing the temperature of the diverted oil, and means for returning the oil to the system.

2. In a temperature controlling means for lubricating systems, the improvement which comprises a reservoir, a passageway through which oil normally flows to the reservoir, means actuated by the temperature of the oil for diverting said flow at least in part, means for changing the temperature of the diverted oil, and means for returning the oil to the reservoir.

3. In a temperature controlling means for lubricating systems, the improvement which comprises an oil pump, a line connected therewith and leading to the bearings to be lubricated, a passageway receiving excess oil from said line, a pressure-regulating valve in said passageway, a second valve in said passageway, thermostatic means responsive to the temperature of the oil and adapted to regulate the position of said second valve to divert oil from said passageway, cooling means connected to receive the diverted oil, and means for returning the cooled oil to the lubricating system.

4. In a temperature controlling means for lubricating systems, the improvement which comprises a pipe arranged with one end immersed in a bulk supply of oil, means for circulating oil through said pipe and into the bulk supply, thermostatic means, a valve for the pipe controlled by said thermostatic means, a pipe connected to a cooling coil adapted to receive oil diverted by operation of said valve, and means for returning cooled oil to the bulk supply.

5. In combination with a lubricating oil system, comprising a reservoir for lubricating oil, an oil pump, a main oil line, a by-pass oil line connected thereto, a pressure control valve and a temperature control valve in said by-pass line, means for cooling progressively larger amounts of oil as the temperature and pressure increases, and means for returning the cooled oil to the said reservoir for lubricating oil.

EARLE W. EVANS.